(12) United States Patent
Hou (10) Patent No.: US 10,745,207 B2
(45) Date of Patent: Aug. 18, 2020

(54) CONVEYOR BELT AND BELT CONVEYOR DEVICE

(71) Applicant: The Yokohama Rubber Co., LTD., Minato-ku, Tokyo (JP)

(72) Inventor: Gang Hou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/463,832

(22) PCT Filed: Oct. 5, 2017

(86) PCT No.: PCT/JP2017/036286
§ 371 (c)(1),
(2) Date: May 23, 2019

(87) PCT Pub. No.: WO2018/096801
PCT Pub. Date: May 31, 2018

(65) Prior Publication Data
US 2019/0329989 A1 Oct. 31, 2019

(30) Foreign Application Priority Data

Nov. 24, 2016 (JP) ................. 2016-228086

(51) Int. Cl.
*B65G 43/02* (2006.01)
*B65G 15/34* (2006.01)
*G01N 27/02* (2006.01)

(52) U.S. Cl.
CPC ............ *B65G 43/02* (2013.01); *B65G 15/34* (2013.01); *G01N 27/025* (2013.01); *B65G 2203/0275* (2013.01); *B65G 2203/043* (2013.01)

(58) Field of Classification Search
CPC ........ B65G 43/02; B65G 15/34; B65G 15/36; B29D 29/06; B29K 2705/00
(Continued)

(56) References Cited

U.S. PATENT DOCUMENTS 3,731,786 A * 5/1973 Nagata ............... B65G 43/02
198/810.02
3,834,518 A * 9/1974 Specht ............... D07B 7/169
198/810.02
(Continued)

FOREIGN PATENT DOCUMENTS

| JP | 2014-031241 | 2/2014 |
|---|---|---|
| JP | 2015-071493 | 4/2015 |
| WO | WO 2014/021045 | 2/2014 |

OTHER PUBLICATIONS

International Search Report for International Application No. PCT/JP2017/036286 dated Nov. 7, 2017, 2 pages, Japan.

*Primary Examiner* — James R Bidwell
(74) *Attorney, Agent, or Firm* — Thorpe North & Western (57) ABSTRACT

Provided are a conveyor belt further enhancing the durability of loop coils embedded in the conveyor belt so as to detect vertical tears in the conveyor belt; and a belt conveyor system using the conveyor belt. A conveyor belt includes a core layer having a plurality of metal cords extending in the belt longitudinal direction arranged in parallel in the belt width direction; an upper cover rubber and a lower cover rubber disposed so as to interpose a core layer from above and below; a plurality of loop coils embedded at intervals in the belt longitudinal direction in the lower cover rubber; and protective layers being disposed between the core layer above and each of the loop coils below and embedded in the lower cover rubber at intervals in the belt longitudinal direction.

4 Claims, 6 Drawing Sheets

(58) Field of Classification Search
USPC .......................................... 198/810.02, 847
See application file for complete search history.

(56) References Cited

U.S. PATENT DOCUMENTS

| | | | | |
|---|---|---|---|---|
| 4,854,446 | A * | 8/1989 | Strader | B65G 43/02 198/810.02 |
| 6,352,149 | B1 * | 3/2002 | Gartland | B65G 43/02 198/810.02 |
| 6,356,201 | B1 * | 3/2002 | Alles | B65G 43/02 340/572.1 |
| 10,196,216 | B2 * | 2/2019 | Sakuragi | B65G 43/02 |
| 2014/0131176 | A1 * | 5/2014 | Minkin | B65G 43/02 198/810.02 |
| 2015/0203299 | A1 | 7/2015 | Enshu | |

* cited by examiner

CONVEYOR BELT AND BELT CONVEYOR DEVICE

TECHNICAL FIELD

The present technology relates to a conveyor belt and belt conveyor system and particularly relates to a conveyor belt further improving the durability of loop coils embedded in the conveyor belt so as to detect vertical tears in the conveyor belt; and a belt conveyor system using this conveyor belt.

BACKGROUND ART

In order to detect a vertical tear of a conveyor belt (cracks continuous in the belt longitudinal direction), a conveyor belt in which loop coils are embedded is known (see Japan Unexamined Patent Publication Nos. 2014-31241 and 2015-71493). In such a conveyor belt, a sensor arranged adjacent to the conveyor belt senses the induced current occurring in loop coils passing near the sensor. If a sharp object or the like to be conveyed pierces the conveyor belt and a vertical tear is generated, the loop coils are damaged, so no induced current is generated in the loop coils. In this case, the sensor does not detect the induced current even though the loop coils have passed through the vicinity. Thus, it is possible to determine whether a vertical tear has occurred in the conveyor belt depending on whether the induced current is detected by the sensor. If it is determined that a vertical tear has occurred on the basis of the detection of the sensor, the operation of the conveyor is stopped in order to prevent expansion of the vertical tear.

Local impacts and external forces are exerted on conveyor belts due to objects to be conveyed or the like to be loaded. Even if a vertical tear does not occur in the conveyor belt due to the impact or external force, the loop coils may be damaged. If loop coils are damaged in this way, the sensors do not detect the induced current even if the loop coils passing through the vicinity. Thus, if judged based on the detection of the sensor, it will be erroneously recognized that vertical tears occur in the conveyor belt.

Japan Unexamined Patent Publication No. 2015-71493 proposes loop coils comprising a metal part and a stretchable conductive material. In this proposal, the durability of the loop coils is improved by mitigating the impact or the like acting on the conveyor belt with the stretchable conductive material. However, in the case where a large impact or stress locally acts on the conveyor belt, it is difficult to prevent damage to the loop coils even if a part of the stretchable conductive material is provided. In addition, when a large impact or stress directly acts on the metal part, the mitigating effect by the stretchable conductive material can hardly be obtained and damage to loop coils cannot be prevented. Therefore, there is room for improvement in improving the durability of loop coils.

SUMMARY

The present technology provides a conveyor belt which can further improve the durability of loop coils embedded in the conveyor belt and detect vertical tears of the conveyor belt; and a belt conveyor system using this conveyor belt.

A conveyor belt according to the present technology includes a core layer having a plurality of metal cords extending in the belt longitudinal direction arranged in parallel in the belt width direction; an upper cover rubber and a lower cover rubber respectively disposed so as to interpose the core layer from above and below; a plurality of loop coils embedded at intervals in the belt longitudinal direction in the lower cover rubber; and a plurality of protective layers disposed between the core layer above and each of the loop coils below and embedded in the lower cover rubber at intervals in the belt longitudinal direction.

The belt conveyor system according to the present technology comprises the conveyor belt, a magnetic field generating unit disposed adjacent to the lower cover rubber to generate a magnetic field for producing an induced current in each of the loop coils, and a sensor disposed adjacent to the lower cover rubber and detecting induced current.

According to the present technology, since the protective layers are disposed between the core layer above and each of the loop coils below; and embedded in the lower cover rubber, the protective layers absorb and mitigate a localized impact or external force from objects to be conveyed acting on the conveyor belt. Specifically, since the metal cords arranged in parallel are constrained by the protective layers, impact and external force acting are widely dispersed in the metal cords. Thus, even if a large impact or external force acts locally on the conveyor belt, the loop coils are hardly damaged and its durability is further enhanced. Along with this, it is advantageous to avoid the situation that the loop coils are damaged even if vertical tears do not occur in the conveyor belt.

Additionally, since the respective protective layers are embedded in the lower cover rubber at intervals in the belt longitudinal direction, a weight increase in the conveyor belt due to the provision of the protective layers can be suppressed, and deterioration of flexibility can also be avoided.

DETAILED DESCRIPTION

A conveyor belt and a belt conveyor system according to the present technology will be described below with reference to the drawings.

Figure 1:
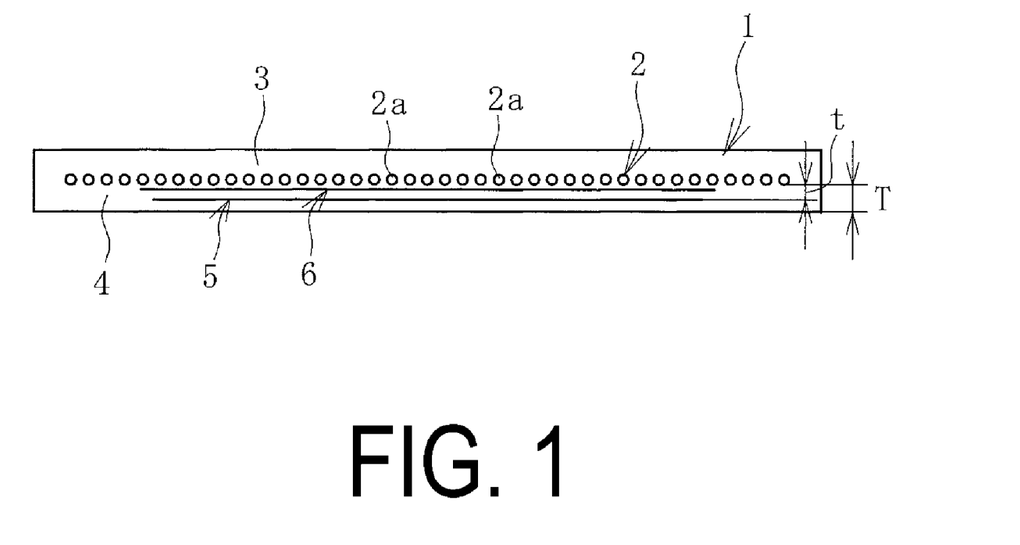
FIG. 1 is a cross-sectional view illustrating a conveyor belt according to an embodiment of the present technology.
Figure 2:
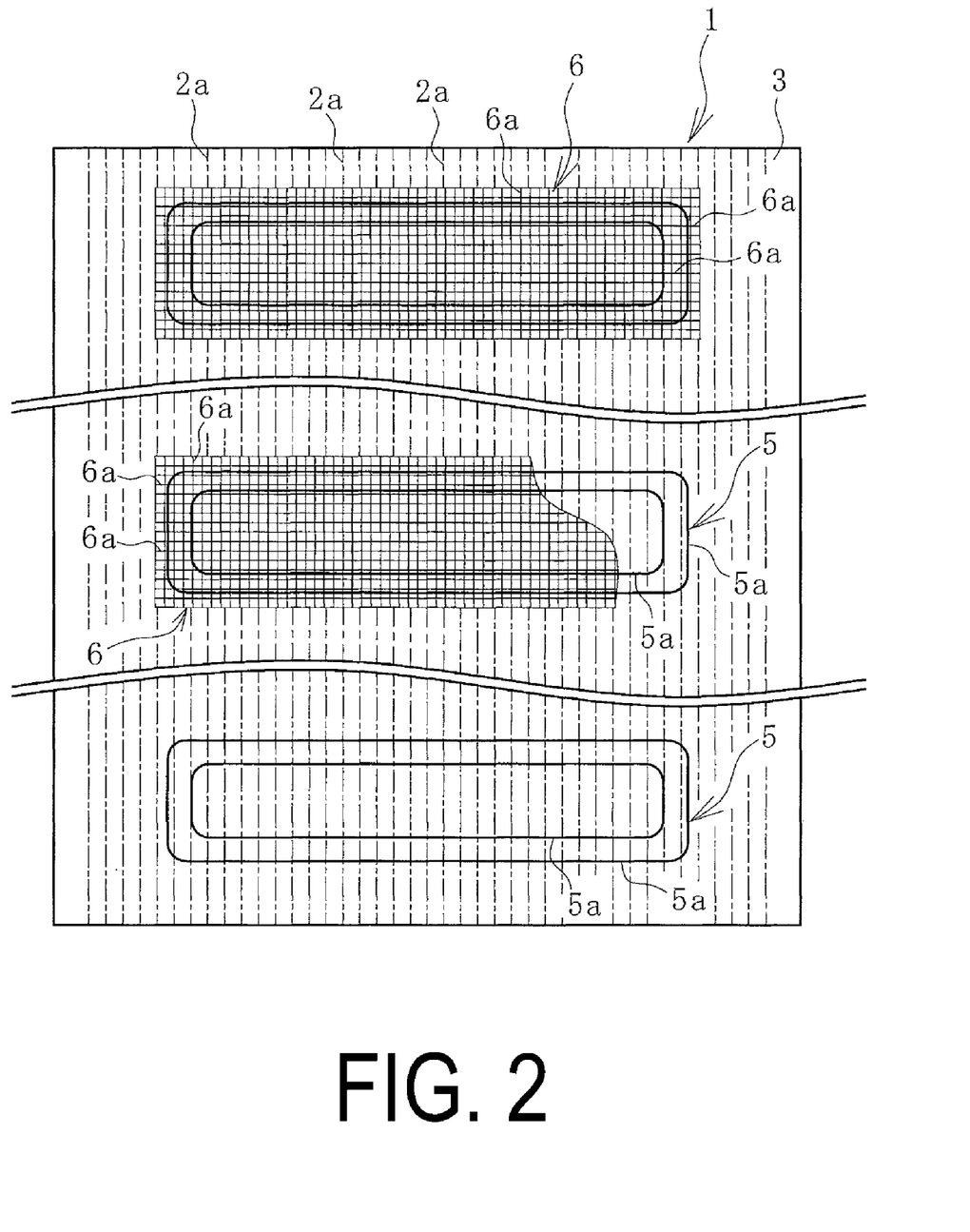
FIG. 2 is an explanatory diagram illustrating the internal structure of the conveyor belt of FIG. 1 in a plan view as viewed from the upper cover rubber side.

A conveyor belt 1 according to the present technology is illustrated in FIGS. 1 and 2. The conveyor belt 1 is provided with a core layer 2, and an upper cover rubber 3 and a lower cover rubber 4 disposed so as to interpose the core layer 2 from above and below. These components are integrally formed with one another via a vulcanization process. The conveyor belt 1 may also include edge rubber disposed on each end portion in the belt width direction or other constituents as appropriate.

In the core layer 2, a plurality of metal cords 2a (steel cords, for example) extending in the belt longitudinal direction are arranged in parallel with each other in the belt width direction. Specifically, the core layer 2 is covered with cushion rubber, and the cushion rubber is bonded to the upper cover rubber 3 and the lower cover rubber 4 via vulcanization bonding.

For the upper cover rubber 3 and the lower cover rubber 4, a rubber composition may be used that contains at least a diene rubber including natural rubber; and carbon black to achieve good wear resistance. The layer thicknesses of the upper cover rubber 3 and the lower cover rubber 4 are determined as appropriate according to the performance required of the conveyor belt 1, within a range of, for example, from 5 mm to 30 mm. The cushion rubber is a rubber with excellent adhesion.

A plurality of loop coils 5 are embedded in the lower cover rubber 4 at intervals in the belt longitudinal direction. The loop coils 5 are, for example, a conductive wire 5a formed in an annular shape, and a known one may be used. The conductive wire 5a may be formed into a wavy shape or a non-wavy shape. The loop coils 5 is not limited to a double quadrilateral shape, and various shapes such as a circular shape and an elliptical shape may be adopted. The loop coil 5 embedded position in a plane is within a region including the central portion in the belt width direction.

The embedding depth position of each of the loop coils 5 is preferably from 30% to 80% the rubber thickness T of the lower cover rubber 4 from the bottom surface of the core layer 2, more preferably from 50% to 60% (rubber thickness t=from 30% to 80% of T). The upper to lower interval between the bottom surface of the core layer 2 and the top surface of the loop coils 5 (rubber thickness t) may be 5 mm or more.

Protective layers 6 are disposed between the core layer 2 above and each of the loop coils 5 below. Namely, the protective layers 6 are embedded in the lower cover rubber 4 at intervals in the belt longitudinal direction. The protective layers 6 are specified to have less elongation (higher modulus) than the rubber used for the conveyor belt 1 under the same conditions. The thickness of the protective layers 6 may be 0.2 mm to 3.0 mm.

Each of the protective layers 6 is disposed so as to cover the entire range of the corresponding loop coils 5 (loop coils 5 disposed closest to each protective layer 6) in a plan view as viewed from the upper cover rubber 3 side. It is possible to set the protective layers 6 so as to cover at least the center portion of the corresponding loop coils 5 in the belt width direction in a plan view as viewed from the upper cover rubber 3. However, in order to reliably protect the loop coils 5, it is preferable that the specification is such that the protective layers 6 are disposed so as to cover the entire range of the loop coils 5, as in the present embodiment. Furthermore, although the metal cords 2a are indicated by dot-dash lines in the middle of FIG. 2 in order to make it easier to understand the internal structure of the conveyor belt 1, they are omitted in the illustration of the first and second protective layers 6 from the top. In addition, in FIG. 2, the second protective layer 6 from the top is partially cut out, and the third protective layer 6 from the top is omitted.

The protective layers 6 can be formed of various materials including natural fibers, resins, metals, and the like. Various structures such as a woven structure and a film shape can be adopted for the protective layers 6. As the woven structure, a plain weave structure, a cord weave structure, a twill weave structure, a sateen weave structure, or the like can be exemplified.

In this embodiment, the protective layers 6 are formed by a plurality of wires 6a. As the wires 6a, a desired wires 6a such as natural fibers, resin fibers metal fibers or the like can be used. This protective layers 6 have a plain weave structure, and thus a plurality of wires 6a extending in the belt width direction are disposed in parallel in the belt longitudinal direction. Thus, the wires 6a extending in the belt width direction intersect with the metal cords 2a disposed in parallel in the belt width direction.

Although the metal cords 2a disposed in parallel are joined by the cushion rubber interposed in the mutual gap between them, the cushion rubber elastically deforms, so the force for constraining displacement of the metal cords 2a in the belt width direction is weak. However, in the present embodiment, the protective layers 6 are disposed so as to cover the metal cords 2a disposed in parallel, so the protective layers 6 restrain and bundle the metal cords 2a adjacent to each other in the belt width direction. Thus, in the present technology, the displacement of the metal cords 2a in the belt width direction is suppressed as compared with a conventional conveyor belt.

Figure 3:
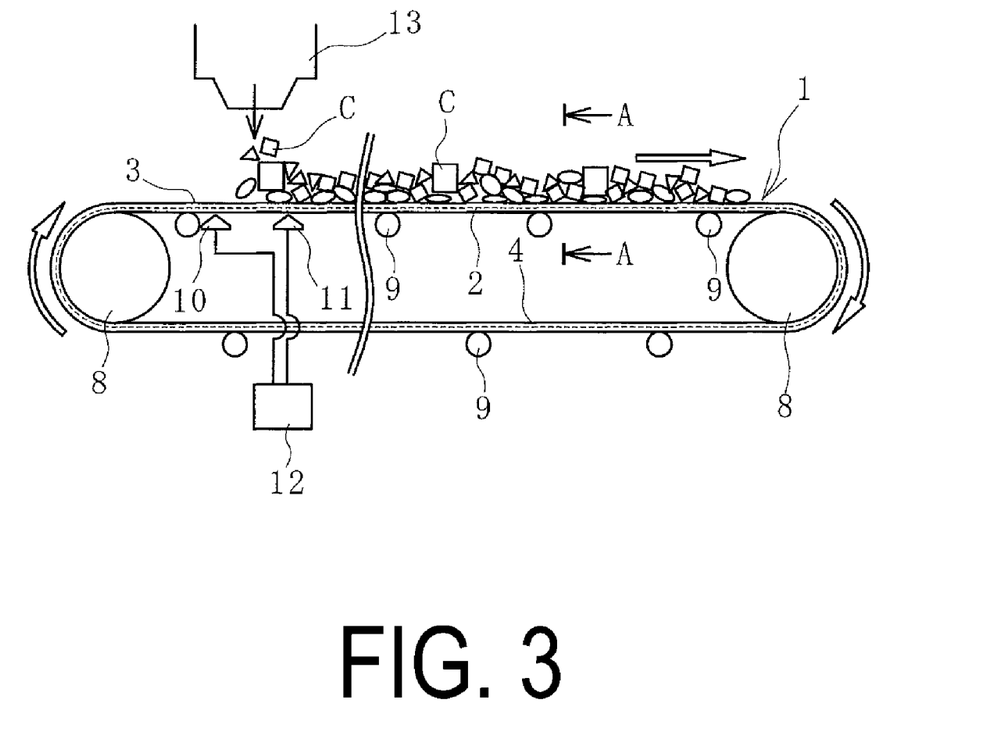
FIG. 3 is an explanatory diagram illustrating a belt conveyor system according to the present technology in a side view.
Figure 4:
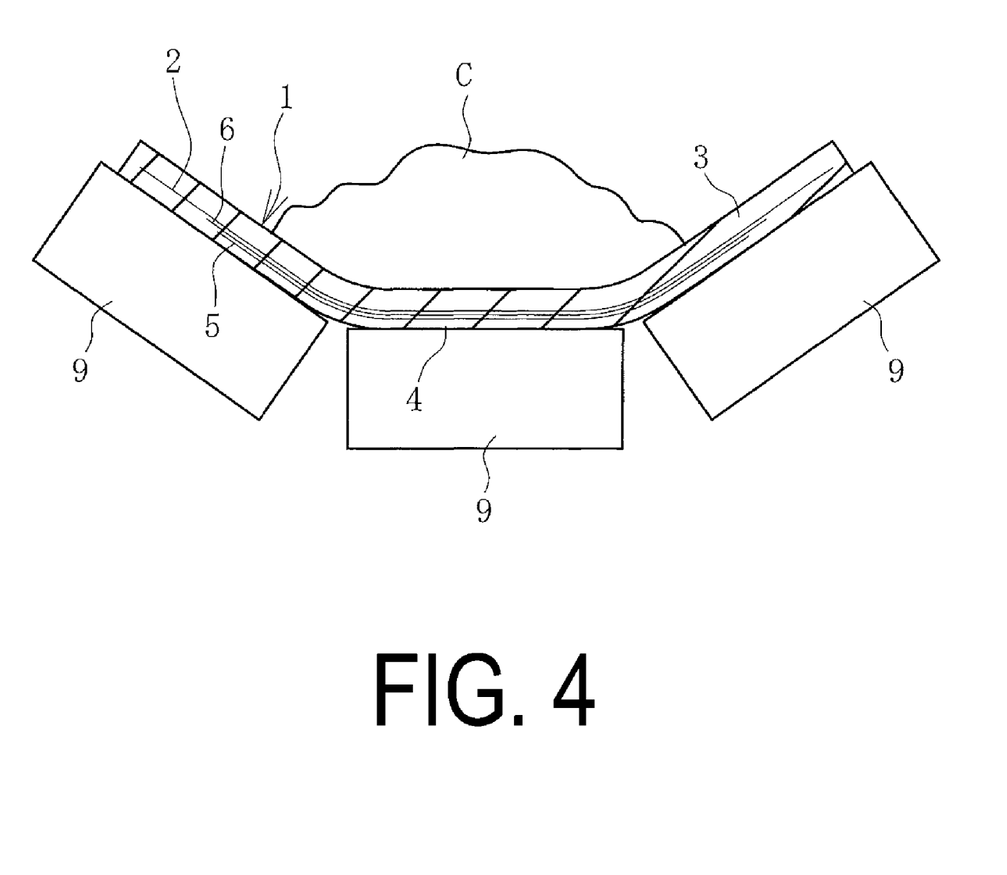
FIG. 4 is a cross-sectional view taken along A-A of FIG. 3.

As illustrated in FIG. 3, a belt conveyor system 7 of the present technology is provided with the conveyor belt 1, a magnetic field generating unit 10, and a sensor 11. The conveyor belt 1 is stretched between pulleys 8, 8. As illustrated in FIG. 4, the conveyor belt 1 is supported on the carrier side in a trough shape projecting downward by support rollers 9, so that the loaded objects to be conveyed C are placed mainly at the center in the belt width direction.

The magnetic field generating unit 10 is disposed adjacent to the lower cover rubber 4. The magnetic field generating unit 10 transmits, for example, an electromagnetic wave to each of the loop coils 5 passing near the magnetic field generating unit 10. An induced current is induced in each of the loop coils 5 due to this electromagnetic wave. If the loop coils 5 are disconnected, no induced current is induced.

The sensor 11 is disposed adjacent to the lower cover rubber 4. The sensor 11 is arranged slightly downstream of the magnetic field generating unit 10 in the forward direction of the conveyor belt 1. The sensor 11 detects whether any induced current is generated for each of the loop coils 5 passing near the sensor 11. Detection data from the sensor 11 are transmitted to a control unit 12. On the basis of the detection data from the sensor 11, the control unit 12 determines that a vertical tear has not occurred in the conveyor belt 1 if an induced current is generated, and if no induced current is generated, the control unit 12 determines that a vertical tear has occurred in the conveyor belt 1. If it is determined that a vertical tear occurs in the conveyor belt 1, the operation of the conveyor belt 1 is stopped, and a warning or the like is issued.

Figure 6:
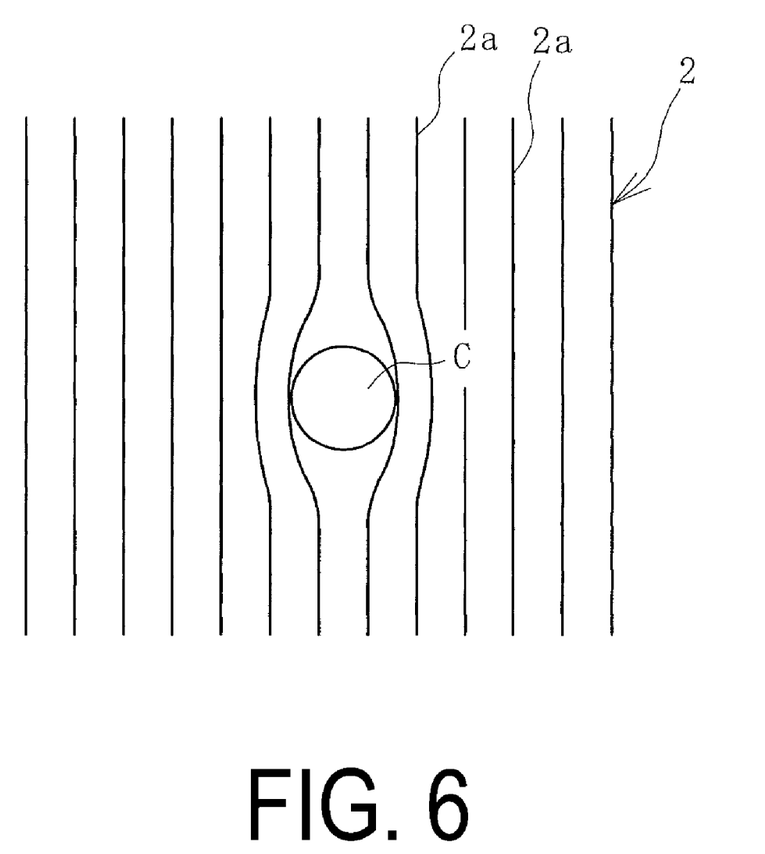
FIG. 6 is an explanatory diagram schematically illustrating the state of the metal cords when a conveyor belt with no embedded protective layers receives impact from the upper cover rubber side in a plan view as viewed from the upper cover rubber side.

As illustrated in FIG. 6, when an object for conveyance C is fed from a chute part 13 onto a conventional conveyor belt 14 in which the protective layers 6 are not embedded, the metal cords 2a tries to be displaced in the belt width direction due to the impact caused by the object for conveyance C and the external force. Specifically, in the local portion of a conveyor belt 14 receiving impact or external force, the interval between the metal cords 2a in the belt width direction is widened. Thus, the impact or external force is easily transmitted to the loop coils 5 embedded below the core layer 2. Namely, in the structure of the conventional conveyor belt 14, a local impact or external force received by the conveyor belt 14 acts greatly on the loop coils 5, so the loop coils 5 are easily damaged.

Figure 5:
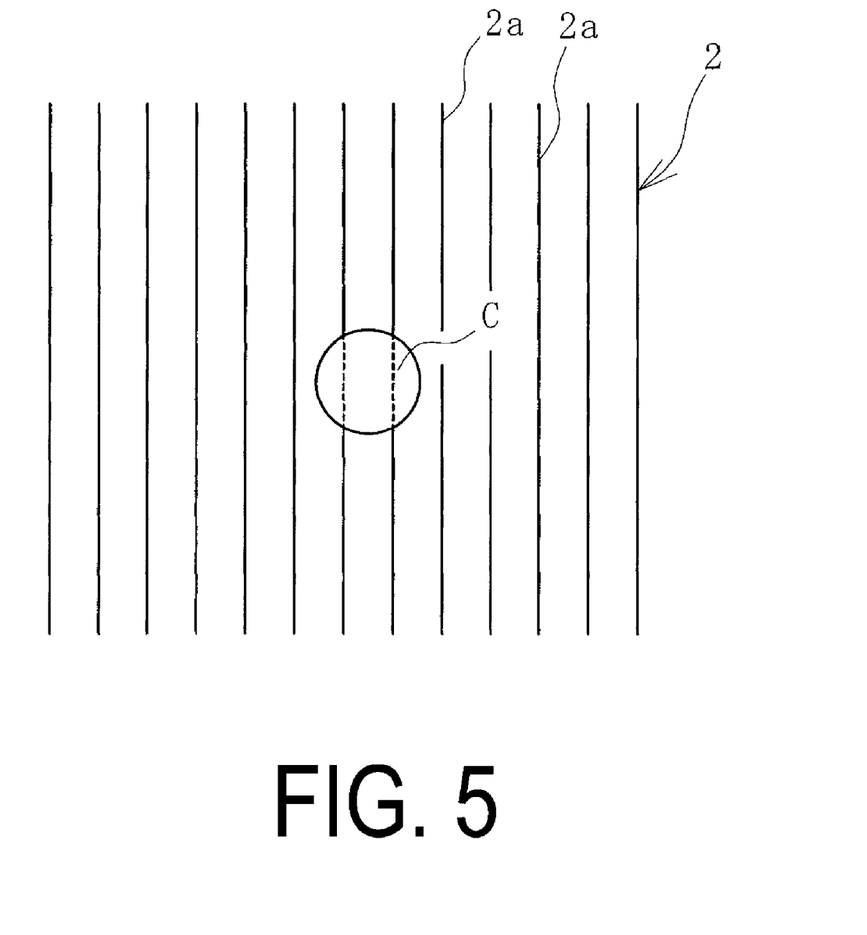
FIG. 5 is an explanatory diagram schematically illustrating the state of the metal cords when the conveyor belt in FIG. 1 receives impact from the upper cover rubber side in a plan view as viewed from the upper cover rubber side.

On the other hand, in the conveyor belt 1 according to the present technology illustrated in FIG. 5, the metal cords 2*a* disposed in parallel are constrained by the protective layers 6, therefore displacement of the metal cords 2*a* in the belt width direction is suppressed even if a local impact or external force acts on the conveyor belt 1 due to an object for conveyance C. Thereby, the impact and the external force acting are widely dispersed among the metal cords 2*a*. In addition, the impact and the external force are absorbed or lessened by the protective layers 6. Thus, even if a large impact or an external force acts locally on the conveyor belt 1, the loop coils 5 are not easily damaged, and its durability is further enhanced. Therefore, the advantage is avoiding damage to loop coils 5 even if no vertical tears occur in the conveyor belt 1, making it possible to more accurately detect vertical tears in the conveyor belt 1. Furthermore, FIG. 5 omits the protective layers 6.

When the object for conveyance C is loaded from the upper cover rubber 3 side under the same conditions onto the conveyor belt having the same specifications except for the presence or absence of the protective layers 6 illustrated in FIGS. 1 and 2, the principal stress generated in the loop coils 5 and the amount of deformation were simulated. The protective layers 6 were embedded at a position 60% the thickness T of the lower cover rubber 4 from the bottom surface of the core layer 2 and were set to a plain weave structure made of nylon fibers. As a result, it has been found that when the protective layers 6 are present, the principal stress generated in the loop coils 5 and the amount of deformation are approximately 60% of those in the absence of the protective layers 6.

Additionally, since the respective protective layers 6 are embedded in the lower cover rubber 4 at intervals in the belt longitudinal direction, the weight increase in the conveyor belt 1 due to provision of the protective layers 6 can be suppressed, and it is also possible to avoid deterioration of flexibility (ease of bending when traveling around the pulley 8). These facts greatly affect reducing the energy required for operating the conveyor belt 1, which contributes to energy-saving.

Furthermore, in order to satisfy the specification of embedding the protective layers 6 in the lower cover rubber 4 at intervals in the belt longitudinal direction, each loop coil 5 may be disposed together with each protective layer 6 in the lower cover rubber 4 in the forming process for the conveyor belt 1. Thus, it is unnecessary to substantially increase the number of steps in manufacturing according to this specification as compared with the case of the specification not embedding the protective layers 6.

If the protective layers 6 have a specification in which a plurality of wires 6*a* extending in the belt width direction are disposed in parallel in the belt longitudinal direction, displacement of the metal cords 2*a* in the belt width direction can be further suppressed by the wire 6*a*. Thus, it is advantageous to avoid damage to the loop coils 5.

When a cord fabric structure (woven structure wherein wires 6*a* in one direction are of significantly lower disposition density than perpendicular wires 6*a* in another direction) is used for the protective layers 6, the wires 6*a* with a higher disposition density are extended in the belt width direction. Thereby, it is possible to realize the effect of avoiding deterioration of flexibility of the conveyor belt 1; and the effect of suppressing the displacement of the metal cords 2*a* in the belt width direction at a high level.

If the loop coils 5 are embedded at a position from 30% to 80% the rubber thickness T of the lower cover rubber 4 from the bottom surface of the core layer 2, more preferably at a position from 50% to 60%, it is advantageous to protect the loop coils 5 from impact or external force due to an object for conveyance C to be loaded. In the case where the loop coils 5 are embedded at a position less than 30% the rubber thickness T from the bottom surface of the core layer 2, impact or external force is easily transmitted to the loop coils 5, which is disadvantageous for preventing damage to the loop coils 5. In addition, when the loop coils 5 are embedded at a position greater than 80% the rubber thickness T from the bottom surface of the core layer 2, since the distance between the loop coils 5 and the surface of the lower cover rubber 4 becomes too small, the impact or external force will be easily transmitted from the lower cover rubber 4 side to the loop coils 5, which is not preferable.

The invention claimed is:

1. A conveyor belt, comprising:
    a core layer having a plurality of metal cords extending in a belt longitudinal direction arranged in parallel in a belt width direction;
    an upper cover rubber and a lower cover rubber respectively disposed so as to interpose the core layer from above and below;
    a plurality of loop coils embedded at intervals in the belt longitudinal direction in the lower cover rubber; and
    a plurality of protective layers disposed between the core layer above and each of the loop coils below and embedded in the lower cover rubber at intervals in the belt longitudinal direction, wherein the protective layers are formed by arranging a plurality of wires extending in the belt width direction in parallel in the belt longitudinal direction.

2. The conveyor belt according to claim 1, wherein each of the protective layers is disposed so as to cover an entire range of corresponding loop coils in a plan view as viewed from an upper cover rubber side.

3. The conveyor belt according to claim 1, wherein each of the loop coils is embedded at a position from 30% to 80% a rubber thickness of the lower cover rubber from a bottom surface of the core layer.

4. A belt conveyor system, comprising:
    the conveyor belt according to claim 1;
    a magnetic field generating unit being disposed adjacent to the lower cover rubber and generating a magnetic field for generating an induced current in each of the loop coils; and
    a sensor being disposed adjacent to the lower cover rubber to detect the induced current.

* * * * *